US011493334B2

(12) United States Patent
Cosneau et al.

(10) Patent No.: US 11,493,334 B2
(45) Date of Patent: *Nov. 8, 2022

(54) METHOD AND FACILITY FOR THE IN-LINE DIMENSIONAL CONTROL OF MANUFACTURED OBJECTS

(71) Applicant: TIAMA, Vourles (FR)

(72) Inventors: Laurent Cosneau, Soucieu-en-Jarrest (FR); Olivier Colle, Oullins (FR)

(73) Assignee: TIAMA, Vourles (FR)

( * ) Notice: Subject to any disclaimer, the term of this patent is extended or adjusted under 35 U.S.C. 154(b) by 289 days.

This patent is subject to a terminal disclaimer.

(21) Appl. No.: 16/758,195

(22) PCT Filed: Oct. 29, 2018

(86) PCT No.: PCT/FR2018/052681
§ 371 (c)(1),
(2) Date: Apr. 22, 2020

(87) PCT Pub. No.: WO2019/081875
PCT Pub. Date: May 2, 2019

(65) Prior Publication Data
US 2020/0300619 A1    Sep. 24, 2020

(30) Foreign Application Priority Data

Oct. 27, 2017   (FR) ...................................... 1760175

(51) Int. Cl.
*G06T 7/62* (2017.01)
*G01B 15/04* (2006.01)
(Continued)

(52) U.S. Cl.
CPC .............. *G01B 15/04* (2013.01); *B07C 5/122* (2013.01); *G01B 15/02* (2013.01); *G06T 7/001* (2013.01);
(Continued)

(58) Field of Classification Search
CPC ...... G01B 15/04; G01B 15/02; G01B 15/045; G01B 15/025; B07C 5/122; G06T 7/001;
(Continued)

(56) References Cited

U.S. PATENT DOCUMENTS

| 5,864,600 A | 1/1999 | Gray et al. |
| 7,221,732 B1 | 5/2007 | Annis |

(Continued)

FOREIGN PATENT DOCUMENTS

| DE | 197 56 697 | 7/1999 |
| DE | 10 2014 103137 | 9/2015 |

(Continued)

OTHER PUBLICATIONS

J.P. Kruth et al., "Computed tomography for dimensional metrology", CIRP Annals-Manufacturing Technology, vol. 60, Issue 2, 2011, pp. 821-842.

*Primary Examiner* — Sheela C Chawan
(74) *Attorney, Agent, or Firm* — Clark & Brody LP

(57) ABSTRACT

A measurement method comprises acquiring, using image sensors (Cji) for each object during its displacement, at least three radiographic images of the region to be inspected. The images are obtained from at least three radiographic projections of the region to be inspected, the directions of projection (Dji) of which are different from each other. A computer system is provided with an a priori geometric model of the region to be inspected for the series of objects. Using the computer system and considering a constant attenuation coefficient and, from the a priori geometric model, at least three radiographic images of the region to be inspected, a digital geometric model of the region to be inspected is determined. For each object of the series, from the digital (Continued)

geometric model of the region to be inspected, at least one linear dimension measurement of the region to be inspected is determined.

35 Claims, 5 Drawing Sheets

(51) Int. Cl.
    *G06T 7/55* (2017.01)
    *B07C 5/12* (2006.01)
    *G01B 15/02* (2006.01)
    *G06T 7/00* (2017.01)

(52) U.S. Cl.
    CPC ............... *G06T 7/55* (2017.01); *G06T 7/62* (2017.01); *G06T 2207/10116* (2013.01); *G06T 2207/30108* (2013.01)

(58) Field of Classification Search
    CPC ... G06T 7/55; G06T 7/62; G06T 2207/10116; G06T 2207/30108
    USPC ....... 382/100, 103, 107, 108, 132, 142, 151, 382/152, 294; 378/1, 4, 9, 19, 21, 22, 51, 378/57, 58, 59, 62, 207
    See application file for complete search history.

(56) References Cited

U.S. PATENT DOCUMENTS

| | | | |
|---|---|---|---|
| 7,319,737 B2 | 1/2008 | Singh | |
| 7,809,177 B2* | 10/2010 | Yoshida | G06T 5/008 |
| | | | 382/128 |
| 7,813,470 B2* | 10/2010 | Kuwabara | G01N 23/087 |
| | | | 378/57 |
| 8,971,484 B2 | 3/2015 | Beckmann et al. | |
| 2009/0262891 A1 | 10/2009 | Zhang et al. | |
| 2010/0220910 A1 | 9/2010 | Kaucic et al. | |
| 2013/0112874 A1* | 5/2013 | Osvath | G01J 1/02 |
| | | | 250/311 |
| 2020/0333133 A1* | 10/2020 | Cosneau | G01B 15/025 |

FOREIGN PATENT DOCUMENTS

| | | |
|---|---|---|
| JP | 60-260807 | 12/1985 |
| WO | 2010/092368 | 8/2010 |

\* cited by examiner

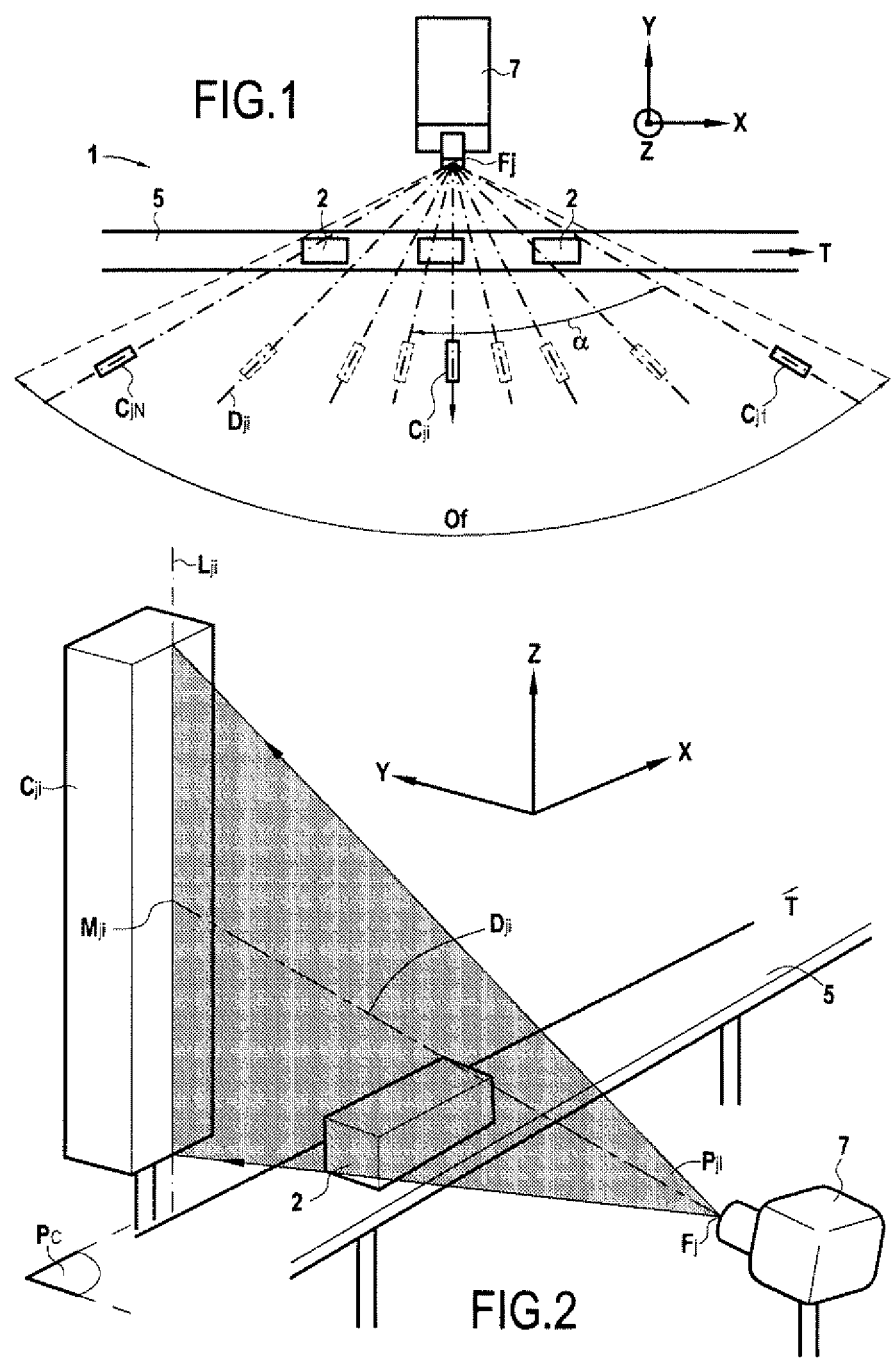

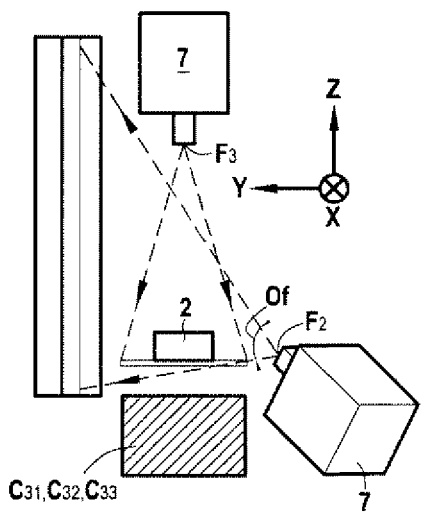
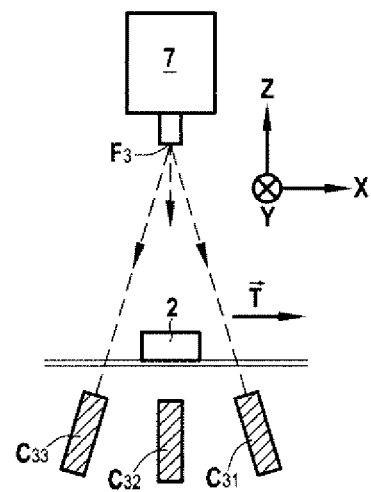
FIG.5  FIG.6
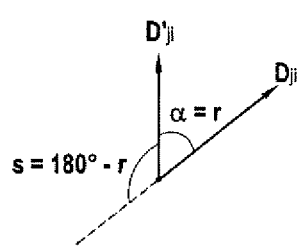
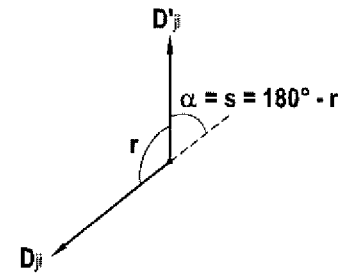
FIG.7  FIG.8

METHOD AND FACILITY FOR THE IN-LINE DIMENSIONAL CONTROL OF MANUFACTURED OBJECTS

The invention concerns the field of dimensional control by X-rays of manufactured objects of identical nature forming a series of objects.

The object of the invention aims more particularly at obtaining the measurement by X-rays, of linear dimensions, that is to say of the lengths taken on manufactured objects in the general sense such as for example on containers, molded or machined parts, mechanical parts, packaging, bodywork elements.

The prior art knows various techniques allowing the dimensional control of objects by X-rays. Baggage inspection systems are also known, which do not aim at measuring the dimensions of known objects but at detecting prohibited objects or prohibited material amounts being in almost random arrangements, shapes and amounts.

Axial rotation systems are thus known, which include computer assisted tomography or CT ("computed tomography"). This conventional method is described in the article of "Computed tomography for dimensional metrology" by J. P. Kruth(1) & all, in *CIRP Annals* Volume 60, Issue 2, 2011, Pages 821-842 and implemented for example, by the tomography devices marketed by the companies Werth Messtechnikor General Electric. This method consists in positioning an object on a turntable around a vertical axis between an X-ray generator tube and a matrix or linear X-ray image sensor. A very large number (at least 100 and often more than 600) of 2D radiographic images of objects are acquired during rotation. If the image sensor is a matrix image sensor, the beam is conical. If the image sensor is a linear image sensor, the beam is advantageously confined in a fan ("fan beam") in a plane orthogonal to the axis of rotation and the rotation is accompanied by a translation along the vertical axis of the rotation, for a full scan of the helical type. This technique can provide highly accurate three-dimensional measurements. However, the acquisition time requires at least one minute for the fastest systems, to which are added the times of loading and unloading of objects so that 10 to 30 objects are inspected at most per hour.

Another solution called rotating gantry solution is provided, for example, by the apparatus known under the trade name "speed/scan CT 64" from the General Electric Company. Like some 3D baggage scanners, this solution concept is similar to medical imaging tomographs in terms of relative movements between source, object and image sensor. Indeed, the manufactured objects or baggage, arranged on a conveyor, are in translation in the apparatus. They pass through a projection plane orthogonal to the displacement direction. In a circular gantry containing said plane, an X-ray source and a generally curved image sensor, opposite the source, are rotated around the central axis of displacement, to obtain, slice by slice or by helical scan, the projections necessary for the 3D reconstruction by an algorithm implementing for example the "filtered rear projection" method or the ART method. The objective of these apparatuses is to allow the acquisition of a very large number of projections at each turn of the gantry, for example 100, or even 700 to 1000 images per slice. The 3D reconstruction of the objects is made for example slice by slice. Indeed, having determined the attenuation at any point of the slice, by concatenating the slices obtained during the displacement of the object, a value of attenuation in any volume element of the object is obtained.

If these vertical axis rotation or rotating gantry apparatuses are very precise thanks to the large number of images provided, these apparatuses are expensive and slow and are in practice reserved for offline control because they are not suitable for the in-line dimensional control for rates which can reach and exceed 600 articles per minute with running of 1 m/s.

Patent application DE 10 2014 103137 describes a method for determining geometrical characteristics on a part to be machined using a system of tomodensitometric detectors, consisting of an X-ray source, a flat detector and a mechanical axis to rotate the part or to rotate the X-ray source and the detector.

The method acquires radiographic images during rotation and ensures a representation of the surface using a model of the surface. Such a method avoids the implementation of steps for reconstructing the volume data in order to reduce the calculation time. Such a technique does not allow parts manufactured at high rate to be measured because it requires the parts to be loaded on a turntable then rotated at least 180° and then unloaded for the control of another part.

To overcome the disadvantages of the tube and image sensor on board a rotating gantry, the patent U.S. Pat. No. 8,971,484 describes a baggage inspection system in which the rotating system is replaced by an array of stationary multibeam X-ray sources actuated successively to create a virtual displacement of the X-ray sources allowing to provide a large number of radiographic images with different angles of projection. Compared to systems with physical rotation limited to 4 revolutions per second, the number of "virtual rotations" is increased to 40 revolutions per second. This technique, which is implemented by the apparatus known under the trade name Rapiscan RTT from the company Rapiscan Systems, is capable of controlling 1 200 pieces of baggage per hour, by producing tens of thousands of 2D images of the baggage, considering that virtual rotation provides about 40 different projection angles.

This technique proves to be very expensive because of the high price for X-ray multi-sources and the calculation power required to process a very large volume of data. In addition, the control rates are still limited and are not suitable for in-line control.

Patents U.S. Pat. Nos. 7,319,737 and 7,221,732 propose to control baggage by a technique called digital laminography or tomosynthesis. The baggage pieces pass through a succession of conical projection planes called a "fan beam" and each containing a pair of linear image sensors arranged in an L shape. These techniques aim at searching for weapons or explosives in the baggage which contains shaped objects and very diverse materials, by visualizing their 3D positions in the baggage and by evaluating for example the volume of a suspect product. It is common to use a multispectral technology in order to also determine the atomic number of the material. These systems therefore seek to determine an attenuation value at any point of a baggage. On the other hand, these systems are not capable of determining at high rate and with accuracy, the dimensions of manufactured objects for the purpose of quality control.

Patent application JP S60 260807 proposes to measure the thickness of the walls of a tube displacing in translation along the axis of the tube, using X-ray measurements from one or more foci with each of which are associated sensors. The foci and the sensors are positioned to produce radiographic projections along a plane orthogonal to the displacement direction of the tube. The radiographic projections are therefore coplanar in a projection plane which is orthogonal to the axis of symmetry of the tube. The direction of these radiographic projections makes a right angle (90°) with respect to the displacement direction. This technique does not allow completely knowing the inner and outer surfaces of the tube. The method described by this patent application allows measuring only the cumulative thickness of the two walls of the tube in the direction of projection, without reconstruction of a three-dimensional model of a tube which would allow accurate measurements to be made in the other directions.

Likewise, the patent U.S. Pat. No. 5,864,600 describes a method for determining the filling level of a container using an X-ray source and a sensor arranged transversely on either side of the transport conveyor of the containers. This system does not allow measurements to be made for a non-transversely oriented surface because this document does not provide for a three-dimensional modeling of the containers.

Patent application US 2009/0262891 describes a system for detecting by X-rays, objects placed in baggage displaced in translation by a conveyor. This system includes pulsed generator tubes or a sensor having a large dimension parallel to the direction of running. This document provides a method for reconstructing the object which is not satisfactory because the absence of projections in the displacement direction does not allow the measurement of dimensions in the direction orthogonal to the displacement direction. The lack of radiographic projections in an angular sector does not allow the creation of a suitable digital model to ensure accurate measurements.

The patent application DE 197 56 697 describes a device having the same disadvantages as patent application US 2009/0262891.

The patent application WO 2010/092368 describes a device for visualizing an object displacing in translation by X-rays using a radiation source and three linear sensors.

The patent application US 2010/220910 describes a method for detecting anomalies of an object by producing a reference 3D model representing an ideal object. The method then aims at comparing a 2D image acquired from a real object with the 2D image corresponding to the reference model to deduce an anomaly therefrom. This method does not allow accurate measurements of an object to be made and allows an object to be controlled only in the 2D images made, therefore only the directions orthogonal to the directions of projection.

The object of the invention aims at overcoming the disadvantages of the prior art by proposing an inexpensive method to be implemented and allowing the accurate dimensional control by X-ray, of manufactured objects running in translation at high rate.

It is known in tomography, that the absence of radiographic projections around a given direction prevents the reconstruction of the surfaces parallel to this direction, creating the phenomenon of "missing border", which prohibits for a dimensional control, the measurement of dimensions orthogonal to the missing radiographic projections.

Another object of the invention therefore aims at proposing a method allowing accurate measurements to be performed on objects displaced in translation, by constructing an accurate and complete three-dimensional digital model while radiographic projections are limited in number and cannot be acquired around the conveying direction of the objects.

According to the invention, the method for automatically measuring linear dimensions of manufactured objects of a series consists in:

selecting a series of manufactured objects in which each of said objects is made of a material with a constant attenuation coefficient at all points of the object;

selecting at least one region to be inspected from the objects in which at least one linear dimension is to be measured;

transporting, by means of a transport device, the moving objects in a displacement direction along a substantially rectilinear trajectory in a conveying plane, these objects generating a conveying volume during their displacement;

positioning, outside the conveying volume, at least one focus of an X-ray generator tube and image sensors each exposed and sensitive to X-rays obtained from an associated focus, these X-rays having passed through at least the region to be inspected producing on each image sensor a radiographic projection in the direction of projection;

acquiring using image sensors, for each object during its displacement, at least three radiographic images of the region to be inspected, obtained from at least three radiographic projections of the region to be inspected, the directions of projection of which are different from each other;

analyzing the at least three radiographic images, using a computer system;

providing the computer system with an a priori geometric model of the region to be inspected for the series of objects;

determining using the computer system by considering a constant attenuation coefficient and from the a priori geometric model and at least three radiographic images of the region to be inspected, a digital geometric model of the region to be inspected consisting of at least two three-dimensional points each belonging to a border surface of the region to be inspected and located in a plane not orthogonal to a direction of projection;

for each object of the series, determining from the digital geometric model of the region to be inspected, at least one linear dimension measurement of the region to be inspected as the distance between at least two three-dimensional points each belonging to a border surface of the region to be inspected and located in a plane not orthogonal to a direction of projection.

In addition, the method according to the invention can further include, in combination, at least one and/or the other of the following additional characteristics:

to determine a digital geometric model consisting of:
at least two three-dimensional points of the space each belonging to a border surface of the region to be inspected and located in a plane not orthogonal to a direction of projection and not parallel to the displacement direction;
and/or at least one three-dimensional surface of the region to be inspected containing points not belonging to a plane orthogonal to a direction of projection, and not belonging to a plane parallel to the displacement direction;
and/or at least one section of the region to be inspected, along a plane different from a plane orthogonal to a direction of projection and different from a plane parallel to the displacement direction;

to provide the computer system with the value of the constant attenuation coefficient;

to provide the computer system with the a priori geometric model of the region to be inspected for the series, obtained by:

the digital model for computer design of objects of the series;

or the digital geometric model obtained from the measurement of one or more object(s) of the same series by a measuring device;

or the digital geometric model generated by the computer system from entered values and/or from drawings and/or shapes selected by an operator on a man machine interface of the computer system;

to position a focus from which a divergent X-ray beam is obtained with an opening greater than or equal to 120° or at least two foci from which divergent X-ray beams are obtained, the sum of the openings of which is greater than or equal to 120°;

to arrange at least one focus in the conveying plane;

to arrange on one side of a plane intersecting with the conveying volume, orthogonal to the conveying plane, a focus from which a divergent X-ray beam is obtained, so that its beam passes through the intersecting plane and the region to be inspected;

to arrange on the opposite side with respect to the intersecting plane, at least one image sensor associated with said focus to receive the X-rays obtained from said focus;

to arrange on one side of the conveying plane, a focus from which a divergent X-ray beam is obtained, so that its beam passes through the conveying plane;

to arrange on the opposite side with respect to the conveying plane, at least one image sensor associated with said focus to receive the X-rays from said focus;

to acquire using image sensors, for each object of the series during its displacement, at least two radiographic images of the inspected region corresponding to directions of projection defining a useful angle greater than or equal to 45° and less than or equal to 90° and, advantageously greater than or equal to 60° and less than or equal to 90°;

to acquire using image sensors, for each object of the series during its displacement at least one radiographic image of the inspected region corresponding to a projection direction having an opening angle with the displacement direction comprised between 10° and 60°;

to make and acquire radiographic projections of the inspected region of an object so that the X-rays from the focus or foci and reaching the image sensors do not pass through any other object;

to acquire, using image sensors, for each object of the series during its displacement, radiographic images obtained from between three and forty, and preferably between four and fifteen radiographic projections of the region to be inspected of different directions;

the image sensors are of the linear type each including a linear array of X-ray sensitive elements, distributed along a support straight line defining with the associated focus, a projection plane containing the projection direction, these image sensors being arranged so that:

at least m sensitive elements of each of these image sensors receive the radiographic projection of the region to be inspected by the X-ray beam obtained from the associated focus;

the projection planes for the different sensors are distinct from each other and not parallel to the conveying plane;

using each of the at least three linear image sensors, at each incremental displacement of each container along the trajectory, radiographic linear images of the region to be inspected are acquired according to a selected number so that for each object, the entire region to be inspected is completely represented in all the linear radiographic images;

analyzing for each object, the at least three sets of linear radiographic images of the region to be inspected.

Another object of the invention is to propose a facility for automatically measuring linear dimensions of at least one region to be inspected of manufactured objects of a series, the facility including:

a device for transporting objects in a direction materialized by a displacement vector, along a substantially rectilinear trajectory in a conveying plane, the objects traversing a conveying volume extended in the direction;

at least one focus of an X-ray generator tube located outside the traversed volume, and creating a divergent X-ray beam directed to pass through at least one region to be inspected of the object;

at least three image sensors, located outside the conveying volume, so as to receive X-rays from an associated focus, the focus or foci and the image sensors being arranged so that each image sensor receives the radiographic projection of the region to be inspected by the rays obtained from the focus when the object passes through these rays, the directions of projection of these radiographic projections being different from each other;

an acquisition system connected to the image sensors, so as to acquire for each object during its displacement, at least three radiographic projections of the region to be inspected with all different directions of projection;

a device for providing a computer system with an a priori geometric model of the region to be inspected for the series of objects; the computer system:

determining a digital geometric model for each object of the series consisting of at least two three-dimensional points each belonging to a border surface of the region to be inspected and located in a plane not orthogonal to a direction of projection, by considering a constant coefficient of attenuation of the material for the objects, from the a priori geometric model and from at least three radiographic projections of the region to be inspected;

determining for each object of the series, from the digital geometric model of the region to be inspected, at least one linear measurement of the region to be inspected as, for each object of the series, the distance between at least two three-dimensional points each belonging to a border surface of the region to be inspected and located in a plane not orthogonal to a direction of projection.

In addition, the facility according to the invention may further include, in combination, at least one and/or the other of the following additional characteristics:

a device for providing the computer system with the attenuation coefficient of the material of the objects of a series;

the device for providing the computer system with an a priori geometric model of the region to be inspected is a mass memory, a wired or wireless computer network or a man machine interface;

a device for providing the computer system with values and/or tolerances for the required linear dimensions, and/or at least one geometric reference model;

at least two foci for producing x-rays, positioned separately in two distinct positions and at least three image sensors, sensitive to x-rays and positioned so that:
  each focus emits its beam through at least the region to be inspected to reach at least one associated sensor;
  each sensor is associated with one focus and receives the X-rays obtained from said focus after passing through the region to be inspected;
at least one focus from which a divergent X-ray beam is obtained with an opening greater than or equal to 120° or at least two foci from which divergent X-ray beams are obtained, the sum of the openings of which is greater than or equal to 120°;
at least one focus arranged in the conveying plane;
on one side of a plane intersecting with the conveying volume and orthogonal to the conveying plane, a focus from which a divergent X-ray beam is obtained, so that its beam passes through the intersecting plane and the region to be inspected;
on the opposite side with respect to the intersecting plane, at least one image sensor associated with said focus for receiving the X-rays obtained from said focus;
on one side of the conveying plane, a focus from which a divergent X-ray beam is obtained, so that its beam passes through the conveying plane;
on the opposite side with respect to the conveying plane, at least one image sensor associated with said focus for receiving the X-rays from said focus;
at least one focus and two image sensors are arranged so that the directions of projection of the inspected region which they receive have therebetween a useful angle greater than or equal to 45° and less than or equal to 90° and, advantageously greater than or equal to 60° and less than or equal to 90°;
at least one focus and one image sensor are arranged so that, when an object passes through the field of the sensors, the direction of projection of the inspected region on the image sensor makes an opening angle with the direction of displacement comprised between 10° and 60°;
the image sensors and the foci are arranged so that the X-rays obtained from the focus or foci and reaching the image sensors and passing through the region of an object do not pass through another object at the same time;
between one and four foci, obtained from one or more X-ray generator tube(s);
the number and arrangement of the image sensors and associated foci, are such that for each object of the series during its displacement, the radiographic projections of the region to be inspected on the image sensors have between three and forty, and preferably between four and fifteen different directions of projection;
the image sensors are of the linear type and each include a linear array of X-ray sensitive elements, distributed along a support straight line defining with the associated focus, a projection plane containing the direction of projection, these image sensors being arranged so that:
  at least m sensitive elements of each of these image sensors receive the radiographic projection of the region to be inspected by the X-ray beam obtained from the associated focus;
  the projection planes for the different sensors are distinct from each other and not parallel to the conveying plane;
  at least three linear image sensors have their support straight lines parallel to each other;
  at least three linear image sensors have their support straight lines orthogonal to the conveying plane;
  a focus is positioned on one side of the conveying plane, and according to the invention at least one associated linear image sensor, is positioned on the side opposite to the focus with respect to the conveying plane and so that its support straight line is parallel to the conveying plane.

Various other characteristics will emerge from the description given below with reference to the appended drawings which show, by way of non-limiting examples, embodiments of the object of the invention.

FIG. 1 is a schematic top view showing a facility allowing the measurement by X-rays, of the dimensions on objects running in-line.

FIG. 2 is a schematic side perspective view showing a portion of the facility allowing the measurement by X-rays of the dimensions on an object.

FIG. 5 is a sectional elevational schematic view of the facility illustrated in FIG. 4.

FIG. 6 is a side elevational schematic view of the facility illustrated in FIG. 4.

FIGS. 7 and 8 are schematic views explaining the definition of the useful angle between two directions of projection.

Figure 3:
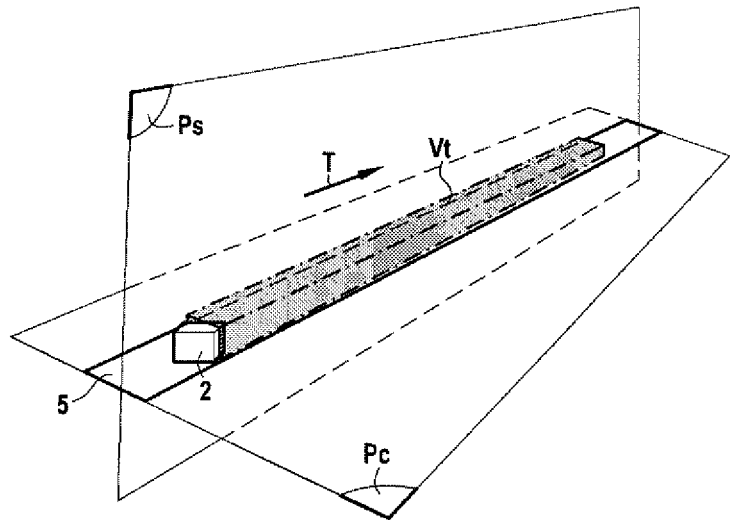
FIG. 3 is a schematic perspective view showing the volume traversed or generated by the objects during their linear displacement.

As a preliminary, some definitions of the terms used in the context of the invention are given below.

A focus Fj of an X-ray generator tube is a point source of X-rays, preferably a "micro focus", for example between 0.01 mm and 1 mm in diameter, creating a divergent X-ray beam. It is possible to use any type of point or quasi-point x-ray source.

A sensitive element is an X-ray sensitive element, in other words an elementary surface, of a dimension for example 0.2×0.2 mm or 0.02×0.02 mm, converting the X-rays which it receives into an electrical signal. Generally, a scintillator converts X-rays into visible light and then a photoelectric sensor converts visible light into an electrical signal. There are also techniques for directly converting X-rays into an electrical signal. A pixel designates an elementary value of a point of a sampled image, characterized by its gray level between 0 and a maximum value. For example, for a 12-bit digital image, a pixel takes digital values between 0 and 4095.

A system for reading or acquiring radiographic images includes one or more X-ray sensitive surface(s), that is to say surfaces comprising sensitive elements converting the X-rays into an electrical signal to be transmitted to an analysis system conventionally implemented by a computer and designated by computer system in the following description. The signals obtained from a set of sensitive elements belonging to the same sensitive surface area, acquired by the acquisition device and transmitted together to the computer system, constitute a radiographic image. In order to be analyzed by the computer system, the radiographic images are preferably converted into digital radiographic images either as close as possible to the sensitive surface or remotely as close as possible to the computer system.

The X-ray beams obtained from a focus Fj pass through at least one inspected region, and form on a sensitive surface, the radiographic projection of the inspected region, which is sometimes called the radiant image and which contains the information of attenuation of X-rays by the traversed material.

An X-ray sensitive surface area that receives the radiographic projection of the inspected region is called image sensor Cji. An image sensor Cji is exposed to X-rays obtained from an associated focus Fj. The image sensor converts this radiographic projection into an X-ray image of the inspected region. When the sensitive surface area contains a line of photosensitive elements, the transmitted radiographic image is linear, composed of a line of pixels forming a one-dimensional array of values. When the sensitive surface area contains a matrix of photosensitive elements, the transmitted radiographic image is a matrix radiographic image, composed of a matrix of pixels forming a two-dimensional array of values.

The projection direction Dji is the oriented direction or the vector, leaving the focus Fj and passing through the center of the image sensor Cji, that is to say through the center of an X-ray sensitive area which receives the radiographic projection of the inspected region at the time of acquisition during the displacement of the object between the focus and the image sensor. For an image sensor-associated focus pair, the direction of projection is the vector coming from the focus reaching the middle of the image sensor. The positioning of the image sensors is such that the sensitive surface is not parallel to the direction of projection. It may be advantageous in some cases for the sensitive surface of the image sensor to be orthogonal to the direction of projection defined with the associated focus. But this is not compulsory, for example if a sensitive surface contains several sensitive areas which cooperate for each image capture, with several different foci, therefore in different directions of projection.

The directions of projection Dji of radiographic projections are different if the directions of projection Dji taken in pairs make therebetween a minimum angle at least equal to 5°.

A sensitive surface area containing a single line of sensitive elements constitutes a linear image sensor, which includes a linear array of sensitive elements, distributed along a support straight-line segment. According to this definition, a column or a line belonging to a matrix sensitive surface, acquired and transmitted separately by the acquisition device is considered to be a linear image sensor. Several sensitive surface areas of the same surface and each containing a single line of different pixels therefore constitute several linear image sensors. The projection direction associated with the linear radiographic image obtained is therefore the direction starting from the focus and passing through the middle of the support straight-line segment at the time of the image acquisition.

Figure 11:
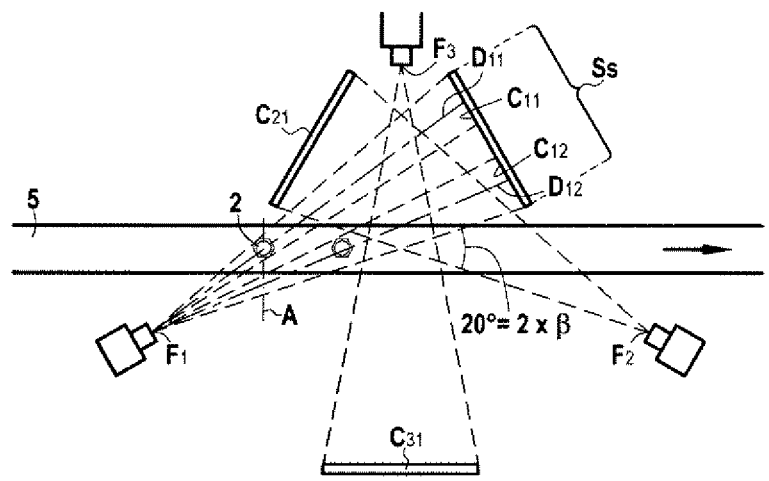
FIG. 11 is a view of an exemplary embodiment of a facility according to the invention implementing matrix image sensors.
Figure 12:
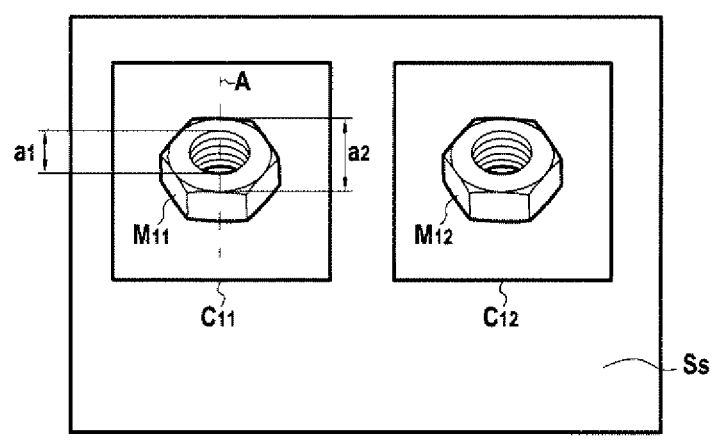
FIG. 12 is a view of a matrix of X-ray sensitive elements showing two distinct areas corresponding to two matrix image sensors.

A sensitive surface area which contains a matrix of sensitive elements constitutes a matrix image sensor, which includes a matrix array of X-ray sensitive elements, distributed in a matrix. As illustrated in FIG. 11, according to this definition, a matrix sensitive surface area C11, C12, which belongs to a larger sensitive surface Ss, and which is acquired and transmitted separately by the acquisition device is a matrix image sensor. Several matrix sensitive surface areas C11, C12 of the same surface, acquired and transmitted separately by the acquisition device therefore constitute several matrix image sensors providing different radiographic images respectively M11, M12 (FIG. 12). The direction D11, D12 of projection associated with the matrix radiographic image respectively M11, M12 is the direction starting from the focus F1 and passing through the middle of the area C11, C12 of the matrix sensitive surface, at the time of acquisition of the image. It is therefore possible that the image sensors C11, C12 are non-disjoint regions activated successively over time.

Of course, the person skilled in the art can use a matrix sensor technology based on an image intensifier or else a "screen capture camera" in which a scintillator plate receives the radiant image, converts it into visible light, the image visible at the rear of the scintillator being photographed by a visible camera provided if necessary with a lens.

The invention applies to series of manufactured objects composed of a material, such as objects obtained by machining, molding, blowing, sintering, injection, extrusion, the attenuation coefficient $\mu$ of which is unique, that is to say having the same value at any point in a region to be inspected of the object and preferably constant over time and identical for the objects of the series. For example, mechanical parts made of steel or aluminum foundry, glass bottles, plastic packaging. These are generally objects called mono-material objects. However, the invention can be implemented for multi-material objects, provided that the attenuation coefficient is constant, in the sense of uniform over the entire inspected region.

It should be noted that the attenuation coefficient $\mu$ of a material is strictly a spectral property $\mu(\lambda)$ according to the wavelength $\lambda$ or the energy of X-rays. This characteristic is not necessarily taken into account to the extent that the X-ray source having its own emitted spectral composition, it is possible to consider that the attenuation $\mu$ is a characteristic of the material for the spectrum of the selected source. The person skilled in the art will moreover know how to carry out the invention using any method of taking into account the spectral attenuation or hardening of the beams.

Of course, local and/or temporal variations in the attenuation coefficient $\mu$ of low amplitude do not prevent the implementation of the method, but could possibly, depending on their amplitude, cause slight or substantial losses of accuracy in the measurements carried out by the facility. It is therefore considered that such slight variations due for example to variations in the composition of the objects, variations in parameters of the manufacturing method, modifications of the environmental conditions, or else changes in the operation of the X-ray sources, are possible while considering the uniqueness and constancy of the attenuation of the material as verified.

The attenuation of the air can be considered negligible compared to that of the material. In this case, the attenuation of an X-ray beam passing through the object will depend only on the one hand, on said constant attenuation for the emitted X-ray spectrum, and on the other hand, on the cumulative traversed thickness of material. Alternatively, it is considered that the thickness of the traversed air is large and uniform for all the beams, therefore it can be considered to be known. The attenuation due to air can be subtracted from the total attenuation measured. Thus, the gray level in each radiographic image, optionally corrected, depends only and directly on the total cumulative material thickness traversed. It is then possible to accurately determine the border surfaces which are the transitions between air and matter.

The digital analysis of the radiographic images of each object allows constructing a three-dimensional digital geometric model of each object, designated by digital geometric model in the following description. Optionally, this digital geometric model can simply be a stack of two-dimensional digital geometric models. Producing a digital geometric model is the way—in mathematical, graphical and data structure terms—in which three-dimensional objects are represented and manipulated in a digital form in a memory of a computer system. It should be considered that the object of the invention aims at determining as many three-dimensional digital geometric models as there are radiographed objects.

The modeling can be volumetric. The mono-material object can therefore be represented by voxels whose value represents an amount of material. The voxel can be full, partially full or empty of material (in this case it is air). The volume geometric model can be analyzed to locate the borders of the object and then to measure linear dimensions such as lengths or thicknesses. It can also be transformed into a surface model, that is to say in which border surfaces of the object are modeled.

It is possible to obtain a surface model directly from radiographic images, that is to say without going through the calculation of a volume model.

In surface modelling, an object is defined by at least a three-dimensional surface. A three-dimensional surface corresponds to the border between the material of the object and the external environment (generally air), which allows understanding the interior and exterior concepts of the object. Generally, three-dimensional surfaces are modeled in several ways such as by polygonal modeling, by parametric curves or surfaces (cylinders, cones, spheres, splines, . . . ) or by subdivision of surfaces. Using a mesh of polyhedra, for example triangles, the three-dimensional surfaces of the objects are represented by sets of flat facets connected by their edges.

A section of a three-dimensional object is its intersection with a plane. The section of three-dimensional surfaces are two-dimensional curves in the section plane. The knowledge of these two-dimensional curves in a succession of section planes allows the reconstruction of three-dimensional surfaces.

In order to make length measurements, there are several approaches.

In a first volume method, it is possible to run through a volume model along a straight line or a beam of straight lines and determine the matter/air border voxels.

In a second surface method, it is possible to calculate a segment whose ends are the intersections of a straight line with the material/air border surface of a surface model. The algorithms solve the topological problems fairly well. The intersection points are unique. Finally, a mixed method consists in transforming the volume model into a surface model, then applying the second method.

A third method consists in determining in a cutting plane, the distance between two points of one or two two-dimensional curves, any curve being a border between the matter and the air.

A three-dimensional point is a point whose coordinates are known in the three-dimensional space, in any reference frame.

These three previous methods are examples of determining a distance between two three-dimensional points, to determine a linear dimension measurement.

The purpose of the invention is to carry out more complete measurements than those made possible by simple two-dimensional radiographic images. Indeed, it is easy using a matrix image sensor to obtain a two-dimensional radiographic image corresponding to a projection of the inspected region and to measure dimensions in a plane orthogonal to the direction of projection called "projected plane". Similarly, it is easy, using a linear image sensor, to obtain a two-dimensional radiographic image corresponding to a fan projection (parallel planes) of the inspected region obtained by juxtaposition of the successive image lines acquired during the displacement in the displacement direction, and to measure dimensions in a projected plane, which is parallel to the displacement direction. On the other hand, according to the invention, linear dimensions can be measured in directions which are neither contained in the projected planes, nor parallel to the projected planes. The method according to the invention indeed consists in reconstructing and measuring dimensions in practically all directions when processing a combination of radiographic images in at least three different projection directions. This is possible by any method allowing the determination of three-dimensional points in the space belonging to a border surface included in the region to be inspected of the object. The reconstruction of a three-dimensional model of the area to be inspected, of a surface or volume type or based on section planes, is a possible method. Indeed, according to the invention, it is possible to either indirectly from a surface or volume model or from section planes, or directly, determine at least two three-dimensional points, or even preferably three-dimensional point clouds, distributed in non-measurable directions only in two-dimensional radiographic images.

The digital geometric model is therefore composed of geometric elements such as points, segments, surfaces, elementary volumes, calculated from radiographic projections, considering to calculate each element, the attenuation of at least some X-rays having passed through this point on the real object, with the purpose that the digital geometric model is a faithful representation of the geometry of the real object, including deformations compared to an ideal object. In other words, the coordinates of the geometric elements are determined by considering that said coordinates have modified the radiographic projections, even when these geometric elements cannot be distinguished in any of the 2D radiographic projections. The measurements of dimensions on the digital geometric model therefore give information on the dimensions of each modeled object, from geometric elements which cannot be distinguished in any of the radiographic projections.

Consequently, an advantage of the method according to the invention is that it consists in determining, for each object, a digital geometric model consisting of at least two three-dimensional points each belonging to a border surface of the region to be inspected and located in a plane not orthogonal to a direction of projection Dji, and not parallel to the displacement direction.

Of course, the advantage of the method is not only to provide measurements in a plane not orthogonal to a direction of projection Dji, but also to provide a large number of measurements distributed in the inspected region, therefore dimensions in many directions, between multiple pairs of points. Preferably, the digital geometric model consists of:

at least two three-dimensional points of the space each belonging to a border surface of the region to be inspected and located in a plane not orthogonal to a direction of projection Dji, and not parallel to the displacement direction T;

at least one three-dimensional surface of the region to be inspected, containing points not belonging to a plane orthogonal to a direction of projection Dji, and not belonging to a plane parallel to the direction T of displacement;

and/or of at least one section of the region to be inspected, according to a plane different from a plane orthogonal to a direction of projection Dji and different from a plane parallel to the displacement direction.

The a priori geometric model is a digital geometric model of the series of objects, used as initialization for a reconstruction software in order to build the digital geometric model of the object. Its role is mainly to provide the computer system with information on the shape, geometry and dimensions of the object to be modeled by calculation. Thanks to these information it becomes possible:

not to model, from radiographic images, the attenuation in regions of the empty image space of the a priori material because the attenuation is considered to be zero therein;

and/or to model from radiographic images only the surfaces on which the measurements of dimensions are to be performed, optionally directly without going through the determination of voxels;

and/or to determine only the deviations between the modeled surfaces from radiographic images and theoretical ideal surfaces.

In the case of mono-material objects, knowledge of the a priori geometric model also allows not to determine from radiographic images, attenuation values in regions of the image space containing material according to the a priori model because it is known as that of the material of manufacture of the object.

However, it should be understood that according to the invention, no measurement of an object is deduced from a measurement on the a priori geometric model, since this model is known independently of said object and represents a non-real theoretical ideal.

As can be seen from the drawings and more specifically from FIGS. 1 and 2, the subject of the invention concerns a facility 1 allowing the implementation of a method for automatically carrying out linear dimension measurements on manufactured objects 2 displacing in high rate running. The invention concerns a control called "in-line" control of a series of manufactured objects, after a transformation or manufacturing step, in order to control the quality of the objects or of the transformation or manufacturing method.

The method operates for a running rate of a flow of objects 2. Ideally, the facility 1 is capable of processing the production at the production rate, for example of 600 objects per minute.

However, the calculation time may exceed the interval between two objects. Likewise, the exposure times of the image and reading sensors may be too long. If the fastest flow cannot be treated by a single facility in accordance with the invention, then several facilities can be implemented in parallel, each controlling a portion of the production. Thus it is possible to divide the production flow into two or three parallel flows inspected by two or three facilities according to the invention. Obviously, the economic interest of the invention is reached if the number of flows and therefore of facilities according to the invention remains low.

The invention brings a considerable improvement thanks to the measurement of running objects, avoiding the helical scanning and the scanning on a plate which are not adapted to the production rates because these two modalities implying a relative rotation of the objects with respect to the foci and/or to the sensors create a "break in the running" or a very slow displacement of the objects within the facility.

The method according to the invention ensures the measurement on each object 2, of at least one and generally of several linear dimensions, that is to say lengths. A length is a measurement expressed in units of length, for example inches or meters, and covers all measurements of linear dimensions such as, for example, diameter, thickness, height, length, width, depth, distance, coordinate, perimeter of manufactured objects. At least one linear measurement of the inspected region is the distance between at least two three-dimensional points each belonging to a border surface of the region to be inspected and located in a plane not orthogonal to a direction of projection Dji.

According to the invention, the objects 2 are objects identical to the dimensional variations, forming a series of objects. In other words, a series is composed of theoretically identical objects when they match. The dimensional control consists in measuring real dimensions and comparing them to the required dimensions. A priori, any object of a series is close to an ideal reference object having the required dimensions but deviates therefrom by dimensional variations.

According to an advantageous embodiment characteristic, at least one region of the object 2 is selected to be inspected so as to be able to carry out dimension measurements in this region of the object, corresponding to a dimensional characteristic of the region to be inspected. At least the region of the object in which the linear dimension(s) are to be measured is inspected by X-rays. Thus, the inspected region can correspond to the entire the object or to one or more regions of this object.

As indicated, all the objects 2 of a series are made of a material having a constant attenuation coefficient at every point of each object.

According to an advantageous variant of the invention, this coefficient is known by the computer system. The method therefore consists in providing a means for providing the value of the attenuation coefficient of the material to the computer system. This value can be spectral, non-spectral, or else made dependent on the settings of the X-ray sources. The provision is possible by different input, communication and memory devices. For example, the device for providing the computer system with the value of the attenuation coefficient of the material is a mass memory, a wired or wireless computer network or a man/machine interface.

The facility 1 also includes a device 5 for transporting the objects 2 in a conveying plane Pc, that is to say along a flat trajectory, with a direction materialized by a displacement vector T. Preferably, the trajectory is substantially rectilinear, but a curve or an arc are possible. Conventionally, the transport device 5 is a belt or chain conveyor ensuring a linear translation of the objects 2 which are deposited thereon. Thus, the objects 2 of the same series are in essentially translational movement in a conveying plane. As shown more specifically in FIGS. 1 and 2, the displacement direction of the objects 2 is established along a horizontal axis X of a reference frame X, Y, Z including a vertical axis Z perpendicular to the horizontal axis X and a transverse axis Y perpendicular to the vertical axis Z and to the horizontal axis X, and X and Y being in a plane parallel to the conveying plane Pc which is preferably, but not necessarily, horizontal.

The position of the objects considered in an orthonormal reference frame movable in translation in the direction T, is fixed during their displacement and the acquisition of the radiographic images. For example, objects are placed on the conveyor belt, in stable support, optionally on a clean laying plane such as the bottom of a container or the feet of a seat.

In a variant of the invention, it is possible to provide a support for the objects 2. In this case, this support is fixed in the orthonormal reference frame movable in translation in the direction T, and it keeps the object also fixed in the orthonormal reference frame movable in translation in the direction T. So that the support does not influence the measurements, according to a first variant it is excluded from the inspected region so as not to appear in superposition of the inspected region in the projections. According to a second variant, its attenuation coefficient is negligible with respect to that of the objects and can be assimilated to air or to a zero attenuation. According to a third less advantageous variant, the geometry of the support, as well as its position in the movable reference frame, are precisely known and repeatable for the series of objects and its attenuation coefficient is precisely known and stable, and preferably identical to that of the objects from the series of objects, so that the support is taken into account in the reconstruction and isolated from the geometric model of the object.

The position of the objects being stable (during running and the acquisition of the radiographs), it remains preferable that this position in the orthonormal reference frame movable in translation in the direction T, is also the same for each object of a series of objects.

If this is not the case, it is then possible according to a variant of the invention, to implement a means for determining the position of each object in the orthonormal reference frame movable in translation in the direction T with respect to a common reference frame of the facility, this position being taken into account by the means for calculating the digital geometric model of the region to be inspected. This preliminary step consists in determining the position of each object, then in matching in a virtual reference frame, the a priori geometric model and the images. In all cases, this amounts to calculating the 3D model of the objects in the orthonormal reference frame movable in translation along the direction T.

As shown more specifically in FIG. 3, during their translational displacement, the objects 2 generate or pass through a volume called conveying volume Vt. The plane Ps is the plane intersecting with the conveying volume Vt, orthogonal to the conveying plane Pc and parallel to the displacement direction T. For example, a median plane separates the volume into two equal sub-volumes. The plane Ps is a vertical plane to the extent that the conveying plane is generally horizontal.

The facility 1 also includes, as illustrated in FIGS. 1 and 2, at least one focus Fj (with j varying from 1 to k) of an X-ray generator tube 7 creating a divergent X-ray beam directed to pass through the conveying volume Vt and more specifically to pass through at least the region to be inspected of the object 2. Facility 1 also includes at least three image sensors Cji (with i varying from 1 to N and N greater than or equal to 3) which are sensitive to X-rays and located so as to be exposed to X-rays obtained from an associated focus Fj and having passed through the conveying volume Vt and more specifically, at least the region to be inspected of the object 2. Of course, the tube 7 and the image sensors Cji are located outside the conveying volume Vt to allow the free displacement of the objects in this volume. Conventionally, the X-ray generator tubes 7 and the image sensors Cji are placed in an X-ray tight enclosure.

The X-ray beams obtained from a focus Fj associated with said image sensor Cji, pass through at least the inspected region, and form on the image sensor, the radiographic projection of the inspected region, in a projection direction Dji (FIGS. 1 and 2). The projection direction Dji is the oriented direction of the vector leaving the focus Fj and passing through the center Mji of the image sensor Cji. The focus or foci Fj and the image sensors Cji are arranged so that each image sensor receives the radiographic projection of the region to be inspected in a projection direction of the region to be inspected.

The facility 1 also includes an acquisition system connected to the image sensors Cji, so as to acquire for each object 2 during its displacement, at least three radiographic projections of the region to be inspected having directions different from each other. It is recalled that the projection direction associated with the obtained radiographic image is the direction starting from the focus and passing through the middle of the sensitive surface area of the sensor, at the time of the acquisition of the image. Thus, the at least three radiographic projections have projection directions of which make, in pairs, an angle therebetween.

The acquisition system is connected to a computer system which is not shown but of all types known per se. According to an advantageous embodiment characteristic, the computer system records using image sensors Cji, for each object of the series during its displacement, radiographic images resulting from a determined number of radiographic projections of the region to be inspected in different directions of projection. Typically, the number of different projection directions Dji is comprised between three and forty, and preferably between four and fifteen. According to an advantageous variant embodiment, the facility 1 includes between three and forty image sensors Cji. According to a preferred variant embodiment, the facility 1 includes between four and fifteen image sensors Cji.

As will be explained in detail in the following description, the computer system is programmed to analyze, for each object, the at least three radiographic images obtained from the at least three radiographic projections of different directions so as to construct a digital geometric model of each object. This digital geometric model can be produced in any suitable manner. Thus, the digital geometric model can be constituted by at least two three-dimensional points each belonging to a border surface of the region to be inspected of the object and located in a plane not orthogonal to a direction of projection Dji, and not parallel to the displacement direction T. The at least two points can belong to two different border surfaces, for example to measure a thickness or an air gap.

The digital geometric model can also consist of a section of the region to be inspected according to a plane different from a plane orthogonal to a direction of projection Dji, and different from a plane parallel to the direction T of displacement. Moreover, the digital geometric model can consist of at least one three-dimensional surface of the region to be inspected, different from a plane orthogonal to a direction of projection Dji and different from a plane parallel to the displacement direction T.

Of course, the invention allows building a digital geometric model with a large number of three-dimensional points, three-dimensional point clouds or complex three-dimensional surfaces.

In accordance with the invention, the digital geometric model is constructed using the attenuation coefficient of the material of the objects of the series and an a priori geometric model of the region to be inspected for the series of objects. In other words, the computer system uses to build the digital geometric model of each object, on the one hand, the attenuation coefficient of the material of the objects and on the other hand, an a priori geometric model of the region to be inspected for the series of objects.

Thus, the computer system takes into account the attenuation coefficient of the material of the objects being inspected for this calculation operation. Advantageously, the facility 1 includes a device for providing the computer system with the coefficient of attenuation of the material of the objects of a series.

This provisioning device can be made by a mass memory, a man machine interface or by a wired or wireless computer network.

Similarly, the computer system has a geometric model called a priori geometric model of the region to be inspected to perform this calculation operation. Thus, the facility 1 includes a device for providing the computer system with an a priori geometric model of the region to be inspected for the series of objects.

The device for providing the computer system with an a priori geometric model of the region to be inspected is a mass memory, a wired or wireless computer network or a man machine interface.

As indicated in the definition part, the a priori geometric model is a digital model of the series of objects, used as initialization for the reconstruction software.

In the absence of knowledge of the a priori geometric model and of the mono-material property of the objects inspected, the reconstruction is extremely costly in calculation, because for each point in the 3D space its attenuation must be calculated. The present invention thus allows carrying out measurements of linear dimensions on objects, with a good accuracy, in a very short time and at low cost.

According to a first variant of the invention, the a priori geometric model is obtained by the digital model of computer design of the objects of the series, made during the design (3D CAD) of the objects. In this case, it is provided to the computer system by various possible means, such as a connection through a computer network, to a database containing several CAD models corresponding to the various series of objects capable of being measured in production, a selection by the operator in a database internal to the facility, etc.

According to a second variant of the invention, the a priori geometric model is obtained from a digital geometric model constructed from the measurement of one or more object(s) of the same series by a measuring device, for example by a measuring machine by a feeler or an axial tomography apparatus, the slowness compared to the invention is recalled. The a priori geometric model can be constructed by a fusion of measurements of several manufactured objects from the same series.

According to a third variant of the invention, the a priori geometric model is a digital geometric model generated by the computer system from entered values and/or from drawings and/or shapes selected by an operator on the man machine interface of the system.

For example, to provide the a priori geometric model in the case of an external hexagon nut type standardized M13, with a threaded hole, the following way is sufficient. The operator enters the number and height of the flats, the diameter and the threading pitch on a keyboard, the system being configured to inspect metric nuts. No additional accurate dimension is indicated. In another example, for the inspection of a polyethylene container, the operator gives only as information that the object is a cylinder closed at the bottom, surmounted by a cone, two diameters, two heights and one thickness are sufficient so that the computer system knows an a priori geometric model of the object to be inspected. According to another example, the computer system can, through its interfaces, receive technical descriptions of the a priori model as a number, diameters, depths and positions of various bores present in a surface which would be part of the region to be inspected by a larger object. The description can be geometric, for example if the computer system receives the number and the general appearance of the surfaces allowing to describe it, the number of cavities, the number of faces or sides of a polyhedron. In summary, it should be understood that the a priori geometric model must at least contain enough technical, geometric, topological and/or digital information, to inform the computer system about the 3D structure of the object, the degree of detail and accuracy of this information can be very low without penalizing the desired accuracy for the linear measurements.

The computer system determines for each object of the series, from the digital geometric model of the region to be inspected corresponding to said object of the series, at least one linear measurement of the region to be inspected in a direction contained in a plane not orthogonal to a projection direction.

According to the invention, one and generally several dimensions are controlled on the objects 2. The purpose is generally to compare the measurements obtained on the objects with required values, for example defined by a quality service. These dimension measurements or the deviations of these measurements from the required values can be displayed, saved, etc. They can also be used to make decisions of conformity on objects that can be sorted automatically.

The measurements can be obtained from the measurements of the digital geometric model of the inspected region established for each object. For example, the inspected region may include a bore. In the digital geometric model, it is possible to determine diameter or depth measurements of the bore, by calculating on the digital geometric model the distances between diametrically opposite surface elements. The object being mono-material, the determination of the position of the surface elements is accurate.

Another means for determining diameter or depth measurements of the bore is to compare the digital geometric model of the inspected region with a reference or theoretical geometric model.

The geometric reference model is an ideal model from the series of inspected objects. To carry out a dimensional control, the digital geometric model of the inspected region can be compared with the reference geometric model, by an algorithm comprising the matching of the models, then the measurement of the differences between the models. The geometric reference model can be taken from the CAD.

It is thus possible to proceed with an operation of matching the digital geometric model of the inspected region with the reference geometric model, then to determine dimensional deviations by measuring distances between surface elements belonging to the reference model and surface elements belonging to the digital geometric model. In the example of the measurement of the bore, it is possible to virtually position, a cylinder of a maximum diameter inscribing in the internal modeled surface of the bore, and similarly a cylinder of a minimum diameter containing said internal modeled surface, and to consider as measurements of the diameter of the bore in the inspected region, the diameter of one and/or the other of the inscribed and described cylinders.

According to one variant of the invention, the reference geometric model and the a priori geometric model are the same geometric model.

According to another variant of the invention, the a priori geometric model is less accurate, less complete and/or is different from the reference geometric model.

To proceed with such measurements, the facility advantageously includes a device for providing the computer system with values of linear dimensions, and/or tolerances on these dimensions, and/or geometric reference models.

According to an advantageous embodiment characteristic, the computer system is connected to a device for displaying the linear measurement values of the region to be inspected and/or dimensional deviations from reference values, and/or deviations between the digital geometric model of the inspected region and a reference geometric model. For example, for a nut, measurements are displayed such as a thread depth, an average thread pitch, an average thread root radius, a height, a minimum or maximum internal diameter, a flatness of one or more of its external faces. For a plastic container, the system will display the total height and for example the minimum diameter and the maximum diameter of the cylindrical portion at a height predefined by the setting of the dimensions to be checked. The dimensions can be displayed with different colors depending on whether they comply or not.

According to an advantageous embodiment characteristic, the computer system is connected to a device for sorting objects depending on the linear measurement of the region to be inspected. Thus, this sorting device can eject from the transport device, the objects considered to be defective in consideration of the measured linear dimensions.

According to an advantageous embodiment characteristic, the computer system is connected to a device for marking objects according to the linear measurement of the region to be inspected. This marking device can record, for example, the measured linear dimensions or the conforming or defective state of the object.

The relative positions of the foci Fj and of the sensors Cji in a fixed reference frame X, Y, Z of the facility are known to the computer system. This position can be obtained by hypothesis or by calibration. The calibration consists, for example, in placing or conveying in the facility a caliber machined with precision.

Of course, the relative positions of the foci Fj and of the image sensors Cji are diverse, it being recalled that the foci Fj and the image sensors Cji are positioned outside the conveying volume Vt.

According to a variant embodiment, the facility 1 includes a single focus Fj=F1 arranged along one side of the conveying volume Vt and a series of image sensors Cji=C1i=C11, C12, C13, . . . arranged along the opposite side of the conveying volume Vt to receive the rays coming from the focus F1 and having passed through the region to be inspected. In this example, the focus has an opening Of which is measured in at least any plane, such as for example the plane X, Y in FIG. 1, which is greater than or equal to 120°. This opening Of is considered at the outlet of the focus, in the case where the facility comprises between the focus and the volume Vt, or between the volume Vt and the image sensors, screens for limiting the beams to only useful beams, in the purpose of reducing broadcast.

According to another variant embodiment, at least two foci Fj (F1 and F2) for producing X-rays, are positioned separately in two distinct positions and at least three image sensors Cji, sensitive to X-rays, are placed so that each focus is associated with at least one image sensor Cji, and each image sensor Cji is associated with a focus and receives X-rays obtained from said focus and passing through the region to be inspected. In this example, each focus has an opening greater than or equal to 60° so that the sum of the openings of the two foci is greater than or equal to 120°.

Figure 4:
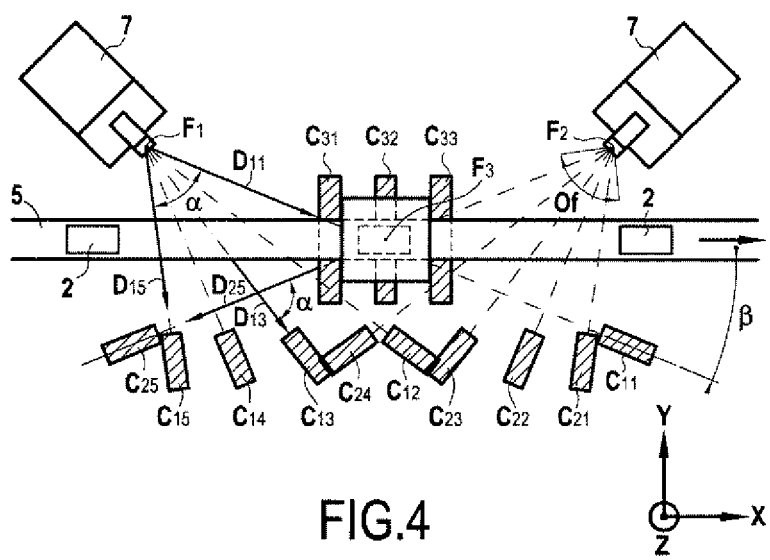
FIG. 4 is a schematic top view showing an exemplary embodiment of a facility in accordance with the invention including three x-ray generating foci.

In the exemplary embodiment illustrated in FIGS. 4 to 6, the facility 1 includes three foci F1, F2, F3 each associated with a separate generator tube 7. The facility 1 also includes five image sensors C11, C12, C13, C14 and C15 each sensitive to X-rays obtained from the first associated focus F1, five image sensors C21, C22, C23, C24 and C25 each sensitive to X-rays obtained from the second associated focus F2 and three image sensors C31, C32, C33 each sensitive to X-rays obtained from the third associated focus F3.

According to this exemplary embodiment, it should be noted that at least one focus (F1 and F2 in the example) from which a divergent X-ray beam is obtained is positioned on one side of the intersecting plane Ps so that its beam passes through the intersecting plane Ps and the region to be inspected, while at least one image sensor Cji associated with said focus Fj for receiving the X-rays obtained from said focus Fj is disposed on the opposite side with respect to the intersecting plane Ps. (In the example, these are the five image sensors C11, C12, C13, C14 and C15 each sensitive to X-rays obtained from the associated focus F1 and the five image sensors C21, C22, C23, C24 and C25 each sensitive to X-rays obtained from the associated focus F2).

According to an advantageous variant embodiment which is illustrated in FIGS. 4 to 6, a focus Fj from which a divergent X-ray beam is obtained is arranged on one side of the conveying plane Pc so that its beam passes through the conveying plane Pc, while at least one image sensor Cji associated with said focus Fj for receiving the X-rays obtained from said focus is positioned on the opposite side with respect to the conveying plane Pc. In the illustrated example, a focus F3 is arranged above the conveying plane Pc while three image sensors C31, C32, C33 are positioned below the conveying plane Pc. Of course, the position between the focus and the image sensors can be reversed with respect to the conveying plane.

According to an advantageous variant embodiment, at least one of the foci Fj is arranged in the conveying plane Pc. Preferably, these foci cooperate with associated image sensors located opposite thereto with respect to the intersecting plane Ps. Thus in the case of a transport of the objects arranged on a flat conveyor, this arrangement allows, in the radiographic images, the projections of objects not to be superimposed on the projection of the conveyor. Thus, in the digital geometric model of the objects, the portion of the object in contact with the conveyor can be determined accurately.

According to an advantageous embodiment characteristic, the arrangement of the image sensors Cji and the foci is such that the X-rays obtained from the focus or foci Fj and reaching the image sensors Cji pass through only one region to be inspected at a time. In other words, X-rays only pass through one object at a time. It should be noted that the facility may include a system for controlling the spacing between successive running objects.

An object of the invention is to obtain a method which is not only quick, but also inexpensive, capable of calculating with the accuracy required for a dimensional control. The invention aims at reducing the number of images required for the reconstruction to the minimum number allowing to achieve the desired dimensional accuracy. For example, the invention allows, with nine projections and a limited number of images of the inspected region, to measure the internal diameter of a cylinder at +/−0.05 mm. Advantageously, the facility in accordance with the invention includes between one and four foci Fj and preferably one or two foci Fj and preferably between four and fifteen image sensors Cji.

According to the invention, it is necessary to arrange the image sensors and the focus or foci so that the combination of at least three directions of projections optimizes the determination of the digital geometric model of the inspected region, considering that the traversed volume Vt must be left free for the circulation of the objects. The following rules are advantageously implemented in the context of the invention, these rules being valid for linear or matrix image sensors.

In what follows, an angle is an absolute value. FIGS. 7 and 8 illustrate two directions of projection Dji and D'ji which are also vectors. These Figures show the angle r between these two directions of projection namely r=(Dy, D'y) and s the angle complementary to the angle r, namely s=180°−r. By definition, the useful angle α between two different projection directions Dji and D'ji, is the smallest of the angles r and s, that is to say α=Min(r, s). Thus, the useful angle α is the smallest of the angles formed by the two straight lines carrying the directions of projection Dji, D'ji and brought back to any point in the inspected region.

According to an advantageous variant of the invention, at least two images obtained from two radiographic projections in two different directions Dji and D'ji forming therebetween a useful angle α greater than or equal to 45° and less than or equal to 90°, are acquired for each object. According to an advantageous variant of the invention, at least two images obtained from two radiographic projections in two different directions forming therebetween a useful angle α greater than or equal to 60° and less than or equal to 90°, are acquired for each object.

For this purpose, the facility 1 according to the invention includes at least one focus and two image sensors arranged so that the directions of projection of the inspected region which they receive have therebetween a useful angle α greater than or equal to 45° and less than or equal to 90° and, advantageously greater than or equal to 60° and less than or equal to 90°.

For example, as illustrated in FIG. 4, the useful angle α between the directions D15 and D11, and between the directions D13 and D25 are greater than 45°. Obviously it should be understood that at least one useful angle is greater than or equal to 45° and less than or equal to 90° and advantageously that at least one useful angle is greater than or equal to 60° and less than or equal to 90° and the other useful angles between two directions Dji, DT are arbitrary. Based on this rule, the person skilled in the art will be able to find an arrangement which provides the most complete possible distribution of projection directions of the inspected region.

According to another advantageous characteristic, for each object, the computer system acquires at least one radiographic image of the inspected region corresponding to a direction of projection making a determined opening angle β with the displacement direction T.

Figure 9:
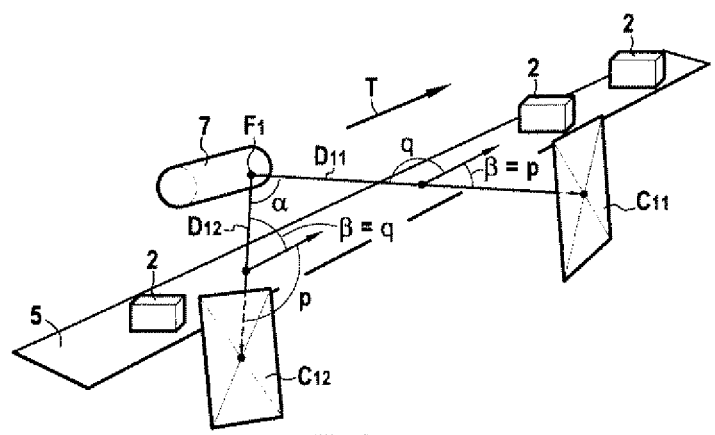
FIGS. 9 and 10 are schematic perspective views showing the positioning of image sensors with respect to the displacement of the objects to be inspected.
Figure 10:
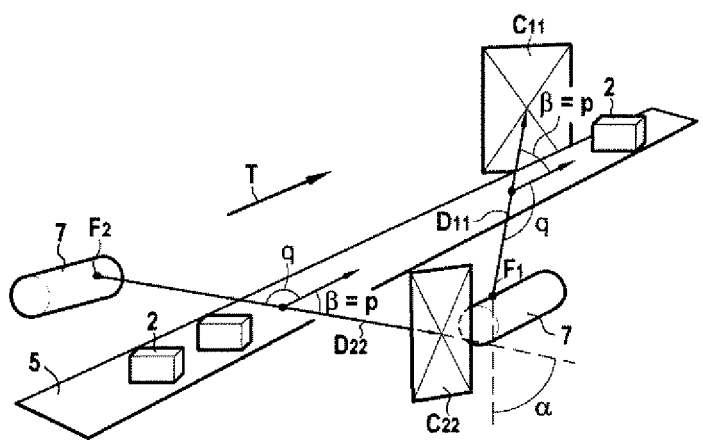

As illustrated in FIGS. 9 and 10, the angle p between a direction of projection (vector Dji) and the trajectory of the objects (vector T) are considered, namely the angle p=(Dji, T), that is to say p=(D11, T) and p=(D12, T) in the example illustrated in FIG. 9 and p=(D22, T) and p=(D11, T) in the example illustrated in FIG. 10. The angle q complementary to the angle p is such that q=180°−p. By definition, the opening angle β between a projection direction Dji and the trajectory T is the smallest of the angles p and q, namely β=Min (p, q). Thus, the opening angle β is the smallest of the angles formed by the two straight lines, one carrying the projection direction Dji and the other the trajectory T, brought back to any point in the inspected region.

According to another advantageous characteristic, for each object, the computer system acquires at least one radiographic image of the inspected region corresponding to a projection direction Dji having, with the displacement direction T, an opening angle β comprised between 10° and 60°. In other words, the facility according to the invention includes at least one focus and one image sensor Cji arranged so that, when an object passes through the field of the image sensors, the direction of projection Dji of the inspected region on the image sensor Cji makes an opening angle β with the displacement direction T comprised between 10° and 60°.

In other words, the configuration of the facility 1 is optimized to reduce its size in the displacement direction while maintaining a traversed volume Vt adapted for the objects and a good quality of reconstruction.

Due to the traversed volume Vt, the facility does not produce a projection around the displacement direction T. The traversed volume Vt imposes a minimum beta angle. According to the invention β min=10°. There is no sensor arranged so as to provide a projection of angle β less than 10°.

It must be deduced from the above that the distribution of the projection angles for each object is not uniform according to the invention.

As illustrated in FIG. 9, the distribution of the projection angles has a gap, which is called a blind spot region, of twice 2×10° or 20°, instead of having complete coverage over 180°.

For example, as illustrated in FIG. 9, a facility according to the invention includes at least one focus F1 and two image sensors C11, C12, the directions of projections D11, D12 of which define with the displacement direction T, an opening angle β comprised between 10° and 60° corresponding respectively to the angles p and q. In the example illustrated in FIG. 10, the facility includes at least one image sensor C11, associated with a focus F1 and an image sensor C22 associated with a focus F2. The projection directions D11, D22 define the opening angle β comprised between 10° and 60° and corresponding to the angles p. Likewise, the facility illustrated in FIG. 4, includes an image sensor C11 associated with the focus F1 and the projection direction D22 of which makes an angle β comprised between 10° and 60°, with respect to the displacement direction T.

The image sensors Cji are of the matrix or linear type.

According to a preferred variant embodiment, the facility 1 includes linear image sensors. According to this preferred variant, each image sensor Cji includes a linear array of X-ray sensitive elements, distributed along a support straight line Lji defining with the associated focus Fj, a projection plane Pji containing the projection direction Dji (FIG. 2). These image sensors Cji are arranged so that at least m sensitive elements of each of these image sensors receive the radiographic projection of the region to be inspected by the X-ray beam from the associated focus Fj, with the projection planes Pji for the various sensors which are distinct from each other and not parallel to the conveying plane Pc. The number m of sensitive elements of each linear image sensor is greater than 128, preferably greater than 512. The distance between neighboring sensitive elements (called "pitch") and/or the dimension of the sensitive elements is preferably less than 800 µm. The reading frequency of the image lines is preferably greater than 100 Hz, advantageously greater than 1 kHz. Of course, these parameters are adapted depending on the size of the objects, the desired accuracy and the running speed.

According to an advantageous embodiment characteristic, at least three linear image sensors Cji have their support straight lines Lji parallel to each other.

According to another advantageous embodiment characteristic, at least three linear image sensors Cji have their support straight lines Lji orthogonal to the conveying plane Pc.

According to one variant, a focus Fj is positioned so that its beam passes through the inspected region and then the conveying plane Pc. In addition, at least one associated linear image sensor Cji is positioned opposite to the focus Fj with respect to the conveying plane Pc and in such a way that its support straight line Lji is parallel to the conveying plane Pc.

According to these variant embodiments with linear image sensors, the acquisition system acquires using each of the at least three image sensors Cji, at each incremental displacement of each object on the trajectory, radiographic linear images of the region to be inspected according to a selected number so that for each object, the entire region to be inspected is completely represented in all the linear radiographic images. Thus, during the displacement of an object, each image sensor is capable of acquiring linear radiographic images so that the entire region to be inspected of the object is completely represented in all the linear radiographic images obtained from said image sensor. Thus, for each object, at least three sets of linear radiographic images of the region to be inspected are obtained, which are then analyzed. Matrix radiographic images of the inspected region can be created by juxtaposing sets of linear radiographic images. But the reconstruction of the geometric model and the measurement do not necessarily impose it.

It should be noted that taking into account the traversed volume Vt, no radiographic projection is acquired in the blind spot region (β<±10°) located on either side of the displacement direction T. The method according to the invention allows, despite the absence of radiographic projections in this angle interval, reconstructing, thanks to the a priori geometric model, an accurate and complete digital geometric model of the mono-material object. It is thus possible to perform measurements of linear dimension over the entire digital geometric model and in particular along directions which are not orthogonal to the possible directions of projection, including linear dimension measurements in measurement directions orthogonal to the directions of the missing projections corresponding to the blind spot region located on either side of the displacement direction T. Indeed, without the method according to the invention, for example with the methods intended for the conventional "complete" axial tomography, in the case where no radiographic projection is acquired in the directions of a blind spot, then the reconstructed model also has in an angular sector orthogonal to the blind spot, reconstruction errors making it impossible to accurately determine a surface and therefore making any measurement of a linear dimension of a mono-material object impossible.

Thus, as illustrated in FIGS. 11 and 12, according to the invention, no projection is possible in a blind spot for example equal to 20° (β min=10°). According to the prior art, no accurate measurement could be made in the direction A, which is not orthogonal to any of the directions of projection. The direction A is not close to the orthogonal of any of the projection directions at least at 10°. According to the invention, thanks to the reconstruction from a priori models of the series of objects and from the constant and uniform attenuation, the measurement of the internal diameter in the direction A (distance a1) and the measurement of the distance between the two outer flats perpendicular to the direction A (distance a2) are fair and accurate. In other words, the geometric model of the region to be inspected has no missing or blurred borders in the direction A.

Of course, the number of foci, the number of image sensors associated with each focus, and their relative arrangements are selected in any suitable manner depending on the desired degree of measurement accuracy, the shape of the objects and their spacing on the conveyor.

It should be noted that in industrial mass production, it is possible that several series are present at the same time on the same production or control line. In this case, the facility includes a system for indicating to the computer system the series to which each of the objects belongs in order to implement the method of the invention for all the objects in the same series. Indeed, the facility according to the invention can be used to inspect a flow of manufactured objects composed of several series of different objects, for example a first series and a second series. The series can differ by the shape of the mono-material objects or by the specific attenuation coefficient or both. In this case, the facility must be provided with a means for providing the computer system with an a priori geometric model of each series of objects, an attenuation coefficient of each series of objects and a means for associating the radiographic images of each object with the series to which it belongs must be provided in the computer system.

The invention claimed is:

1. A method for automatically measuring linear dimensions of manufactured objects (2) of a series consisting in:
    selecting a series of manufactured objects (2) in which each of said objects is made of a material with a constant attenuation coefficient at all points of the object;
    selecting at least one region to be inspected from the objects in which at least one linear dimension is to be measured;
    transporting, by means of a transport device, the moving objects in a displacement direction (T) along a substantially rectilinear trajectory in a conveying plane (Pc), these objects generating a conveying volume (Vt) during their displacement;
    positioning, outside the conveying volume (Vt), at least one focus (Fj) of an X-ray generator tube and image sensors (Cji) each exposed and sensitive to X-rays obtained from an associated focus (Fj), these X-rays having passed through at least the region to be inspected producing on each image sensor a radiographic projection in the direction of projection (Dji);
    acquiring using image sensors (Cji), for each object during its displacement, at least three radiographic images of the region to be inspected, obtained from at least three radiographic projections of the region to be inspected, the directions of projection (Dji) of which are different from each other;
    analyzing the at least three radiographic images, using a computer system;

providing the computer system with an a priori geometric model of the region to be inspected for the series of objects;

determining using the computer system by considering a constant attenuation coefficient and from the a priori geometric model and at least three radiographic images of the region to be inspected, a digital geometric model of the region to be inspected for each object of the series consisting of at least two three-dimensional points each belonging to a border surface of the region to be inspected and located in a plane not orthogonal to a direction of projection Dji;

for each object of the series, determining from the digital geometric model of the region to be inspected, at least one linear dimension measurement of the region to be inspected as the distance between at least two three-dimensional points each belonging to a border surface of the region to be inspected and located in a plane not orthogonal to a direction of projection (Dji).

2. The method according to claim 1, characterized in that it consists in determining a digital geometric model consisting of:

at least two three-dimensional points of the space each belonging to a border surface of the region to be inspected and located in a plane not orthogonal to a direction of projection (Dji), and not parallel to the displacement direction (T);

and/or at least one three-dimensional surface of the region to be inspected containing points not belonging to a plane orthogonal to a direction of projection (Dji), and not belonging to a plane parallel to the displacement direction (T);

and/or at least one section of the region to be inspected, according to a plane different from a plane orthogonal to a direction of projection (Dji) and different from a plane parallel to the displacement direction (T).

3. The method according to claim 1, characterized in that it consists in providing the computer system with the value of the constant attenuation coefficient.

4. The method according to claim 1, characterized in that it consists in providing the computer system with the a priori geometric model of the region to be inspected from the series, obtained by:

the digital model for computer design of objects of the series;

or the digital geometric model obtained from the measurement of one or more object(s) of the same series by a measuring device;

or the digital geometric model generated by the computer system from entered values and/or from drawings and/or shapes selected by an operator on a man machine interface of the computer system.

5. The method according to claim 1, characterized in that a focus from which a divergent X-ray beam is obtained with an opening greater than or equal to 120° or at least two foci from which divergent X-ray beams are obtained the sum of the openings of which is greater than or equal to 120°, is positioned.

6. The method according to claim 1, claims, characterized in that it consists in arranging at least one focus in the conveying plane (Pc).

7. The method according to claim 1, characterized in that it consists in:

arranging on one side of a plane (Ps) intersecting with the conveying volume (Vt), orthogonal to the conveying plane (Pc), a focus (Fj) from which a divergent X-ray beam is obtained, so that its beam passes through the intersecting plane (Ps) and the region to be inspected;

arranging on the opposite side with respect to the intersecting plane (Ps), at least one image sensor (Cji) associated with said focus (Fj) to receive the X-rays obtained from said focus (Fj).

8. The method according to claim 1, characterized in that it consists in:

arranging on one side of the conveying plane (Pc), a focus (Fj) from which a divergent X-ray beam is obtained, so that its beam passes through the conveying plane (Pc);

arranging on the opposite side with respect to the conveying plane (Pc), at least one image sensor (Cji) associated with said focus (Fj) to receive the X-rays from said focus (Fj).

9. The method according to claim 1, characterized in that it consists in acquiring, using image sensors (Cji), for each object of the series during its displacement, at least two radiographic images of the inspected region corresponding to directions of projection (Dji) defining a useful angle ($\alpha$) greater than or equal to 45° and less than or equal to 90° and, advantageously greater than or equal to 60° and less than or equal to 90°.

10. The method according to claim 1, characterized in that it consists in acquiring, using image sensors (Cji), for each object of the series during its displacement at least one radiographic image of the inspected region corresponding to a projection direction (Dji) having an opening angle ($\beta$) with the displacement direction (T) comprised between 10° and 60°.

11. The method according to claim 1, characterized in that it consists in acquiring, using image sensors (Cji), for each object of the series during its displacement, no radiographic image of the inspected region corresponding to a projection direction (Dji) having an opening angle ($\beta$) with the displacement direction (T) less than 10°.

12. The method according to claim 1, characterized in that it consists in making and acquiring radiographic projections of the inspected region of an object so that the X-rays from the focus or foci and reaching the image sensors (Cji) do not pass through any other object.

13. The method according to claim 1, characterized in that it consists in acquiring, using image sensors (Cji), for each object of the series during its displacement, radiographic images obtained from between three and forty, radiographic projections of the region to be inspected of different directions.

14. The method according to claim 1, characterized in that it consists in acquiring, using image sensors (Cji), for each object of the series during its displacement, radiographic images obtained from between four and fifteen radiographic projections of the region to be inspected of different directions.

15. The method according to claim 1, characterized in that:

the image sensors (Cji) are of the linear type each including a linear array of X-ray sensitive elements, distributed along a support straight line (Lji) defining with the associated focus (Fj), a projection plane (Pji) containing the direction of projection (Dji), these image sensors being arranged so that:

at least m sensitive elements of each of these image sensors receive the radiographic projection of the region to be inspected by the X-ray beam obtained from the associated focus (Fj);

the projection planes (Pji) for the different sensors are distinct from each other and not parallel to the conveying plane (Pc);

using each of the at least three linear image sensors (Cji), at each incremental displacement of each container along the trajectory (T), radiographic linear images of the region to be inspected are acquired according to a selected number so that for each object, the entire region to be inspected is completely represented in all the linear radiographic images;

analyzing for each object, the at least three sets of linear radiographic images of the region to be inspected.

16. A facility for automatically measuring linear dimensions of at least one region to be inspected of manufactured objects of a series, the facility including:

a device for transporting objects in a direction materialized by a displacement vector (T), along a substantially rectilinear trajectory in a conveying plane (Pc), the objects traversing a conveying volume (Vt) extended in the direction (T);

at least one focus (Fj) of an X-ray generator tube located outside the traversed volume (Vt), and creating a divergent X-ray beam directed to pass through at least one region to be inspected of the object;

at least three image sensors (Cji), located outside the conveying volume (Vt), so as to receive X-rays obtained from an associated focus (Fj), the focus or foci (Fj) and the image sensors (Cji) being arranged so that each image sensor receives the radiographic projection of the region to be inspected by the rays obtained from the focus (Fj) when the object passes through these rays, the directions of projection of these radiographic projections being different from each other;

an acquisition system connected to the image sensors (Cji), so as to acquire for each object during its displacement, at least three radiographic projections of the region to be inspected with all different directions of projection (Dij);

a device for providing a computer system with an a priori geometric model of the region to be inspected for the series of objects; the computer system:
determining a digital geometric model for each object of the series consisting of at least two three-dimensional points each belonging to a border surface of the region to be inspected and located in a plane not orthogonal to a direction of projection (Dji), by considering a constant coefficient of attenuation of the material for the objects, from the a priori geometric model and from at least three radiographic projections of the region to be inspected;
determining for each object of the series, from the digital geometric model of the region to be inspected, at least one linear measurement of the region to be inspected as the distance between at least two three-dimensional points each belonging to a border surface of the region to be inspected and located in a non-orthogonal projection plane (Dji).

17. The facility according to claim 16, characterized in that it comprises a device for providing the computer system with the attenuation coefficient of the material of the objects of a series.

18. The facility according to claim 17, characterized in that the device for providing the computer system with an a priori geometric model of the region to be inspected is a mass memory, a wired or wireless computer network or a man machine interface.

19. The facility according to claim 16, characterized in that it comprises a device for providing the computer system with values and/or tolerances for the required linear dimensions, and/or at least one geometric reference model.

20. The facility according to claim 16, characterized in that it comprises at least two foci (F1, F2) for producing X-rays, positioned separately in two distinct positions and at least three image sensors (Cji), sensitive to X-rays and positioned so that:
each focus emits its beam through at least the region to be inspected to reach at least one associated sensor (Cji);
each sensor (Cji) is associated with one focus and receives the X-rays obtained from said focus after passing through the region to be inspected.

21. The facility according to claim 16, characterized in that it includes, at least one focus from which a divergent X-ray beam is obtained with an opening greater than or equal to 120° or at least two foci from which divergent X-ray beams are obtained the sum of the openings of which is greater than or equal to 120°.

22. The facility according to claim 16, characterized in that it includes at least one focus disposed in the conveying plane (Pc).

23. The facility according to claim 16, characterized in that it includes:
on one side of a plane (Ps) intersecting with the conveying volume and orthogonal to the conveying plane (Pc), a focus (Fj) from which a divergent X-ray beam is obtained, so that its beam passes through the intersecting plane (Ps) and the region to be inspected;
on the opposite side with respect to the intersecting plane (Ps), at least one image sensor (Cji) associated with said focus (Fj) to receive the X-rays obtained from said focus (Fj).

24. The facility according to claim 16, characterized in that it includes:
on one side of the conveying plane (Pc), a focus (Fj) from which a divergent X-ray beam is obtained, so that its beam passes through the conveying plane (Pc);
on the opposite side with respect to the conveying plane (Pc), at least one image sensor (Cji) associated with said focus (Fj) to receive the X-rays obtained from said focus (Fj).

25. The facility according to claim 16, characterized in that at least one focus and two image sensors are arranged so that the directions of projection of the inspected region which they receive have therebetween a useful angle ($\alpha$) greater than or equal to 45° and less than or equal to 90° and, advantageously greater than or equal to 60° and less than or equal to 90°.

26. The facility according to claim 16, characterized in that at least one focus and one image sensor (Cji) are arranged so that, when an object passes through the field of the sensors, the direction of projection (Dji) of the inspected region on the image sensor (Cji) makes an opening angle ($\beta$) with the displacement direction (T) comprised between 10° and 60°.

27. The facility according to claim 16, characterized in that, no focus (Fj) of an X-ray generator tube is located in the traversed volume (Vt), no image sensors (Cji), is located in the conveying volume (Vt), when an object passes through the sensor field, the direction of projection (Dji) of the inspected region on the image sensor (Cji) never makes an opening angle ($\beta$) with the displacement direction (T) less than 10°.

28. The facility according to claim 16, characterized in that the image sensors (Cji) and the foci (Fj) are arranged so that the X-rays obtained from the focus or foci and reaching the image sensors (Cji) and passing through the region of an object do not pass through another object at the same time.

29. The facility according to claim 16, characterized in that it includes between one and four foci (Fj), obtained from one or more X-ray generator tube(s).

30. The facility according to claim 16, characterized in that the number and arrangement of the image sensors (Cji) and associated foci, are such that for each object of the series during its displacement, the radiographic projections of the region to be inspected on the image sensors have between three and forty different projection directions.

31. The facility according to claim 16, characterized in that the number and arrangement of the image sensors (Cji) and associated foci, are such that for each object of the series during its displacement, the radiographic projections of the region to be inspected on the image sensors have between four and fifteen different projection directions.

32. The facility according to claim 16, characterized in that:
  the image sensors (Cji) are of the linear type and each include a linear array of X-ray sensitive elements, distributed along a support straight line (Lji) defining with the associated focus (Fj), a projection plane (Pji) containing the projection direction (Dji), these image sensors being arranged so that:
    at least m sensitive elements of each of these image sensors receive the radiographic projection of the region to be inspected by the X-ray beam from the associated focus (Fj);
    the projection planes (Pji) for the different sensors are distinct from each other and not parallel to the conveying plane (Pc).

33. The facility according to claim 32, characterized in that at least three linear image sensors (Cji) have their support straight lines (Lji) parallel to each other.

34. The facility according to claim 32, characterized in that at least three linear image sensors (Cji) have their support straight lines (Lji) orthogonal to the conveying plane (Pc).

35. The facility according to claim 32, characterized in that a focus (Fj) is positioned on one side of the conveying plane (Pc), and in that at least one associated linear image sensor (Cji), is positioned on the side opposite to the focus (Fj) with respect to the conveying plane (Pc) and so that its support straight line (Lji) is parallel to the conveying plane (Pc).

* * * * *